United States Patent [19]

Kramer

[11] Patent Number: 4,945,677

[45] Date of Patent: Aug. 7, 1990

[54] SWINGING AND SLIDING DOOR FOR A VEHICLE, ESPECIALLY A MOTOR VEHICLE

[75] Inventor: Hans Kramer, Baunatal, Fed. Rep. of Germany

[73] Assignee: Gebr. Bode & Co. GmbH, Kassel, Fed. Rep. of Germany

[21] Appl. No.: 350,070

[22] Filed: May 10, 1989

[30] Foreign Application Priority Data

May 11, 1988 [DE] Fed. Rep. of Germany ....... 3816175

[51] Int. Cl.⁵ .............................................. E05F 11/38
[52] U.S. Cl. ...................................... 49/210; 49/139;
 49/218; 49/254; 49/280; 296/155
[58] Field of Search ................ 49/216, 218, 219, 220,
 49/139, 280, 322, 254, 334, 340, 360, 246, 210;
 296/155

[56] References Cited

U.S. PATENT DOCUMENTS

| | | | |
|---|---|---|---|
| 3,051,999 | 9/1962 | Schimek | 49/216 |
| 4,019,775 | 4/1977 | Grossbach | 296/155 |
| 4,135,760 | 1/1979 | Grossbach | 296/155 |
| 4,640,050 | 2/1987 | Yamagishi | 49/280 |
| 4,644,692 | 2/1987 | Schindehütte | 49/360 X |

FOREIGN PATENT DOCUMENTS

| | | | |
|---|---|---|---|
| 305024 | 12/1988 | Japan | 296/155 |
| 705220 | 3/1954 | United Kingdom | 49/360 |

Primary Examiner—Philip C. Kannan
Assistant Examiner—Jerry Redman
Attorney, Agent, or Firm—Sprung Horn Kramer & Woods

[57] ABSTRACT

A swinging and sliding door for a vehicle, especially a motor vehicle, with a door panel, with at least one pivoting arm secured to the wall of the vehicle, with a carriage articulated to the end of the arm and sliding back and forth on a carrier connected to the door panel, and with a drive mechanism secured to the wall of the vehicle and having one wheel that drives a flexible linear-transmission structure guided by rollers and attached to the door panel to generate the sliding motion and another wheel that generates the swinging motion. The axis of rotation of the first wheel and that of the second wheel are concentric with the axis of rotation of the pivoting arm and both wheels can be coupled to a common motor by way of automatic clutches.

10 Claims, 4 Drawing Sheets

SWINGING AND SLIDING DOOR FOR A VEHICLE, ESPECIALLY A MOTOR VEHICLE

BACKGROUND OF THE INVENTION

The invention concerns a swinging and sliding door for a vehicle, especially a motor vehicle, with a door panel, with at least one pivoting arm secured to the wall of the vehicle, with a carriage articulated to the end of the arm and sliding back and forth on a carrier connected to the door panel, and with a drive mechanism secured to the wall of the vehicle and having one wheel that drives a flexible linear transmission structure guided by rollers and attached to the door panel to generate the sliding motion and another wheel that generates the swinging motion.

Swinging and sliding doors for motor vehicles are known that have a door panel and at least one pivoting arm secured to the wall of the vehicle with a carriage articulated to the end of the arm and sliding back and forth on a carrier connected to the door panel. Doors of this type are opened and closed manually and incorporate guide mechanisms that ensure that the panel will start to open by pivoting out of the doorway, after which it can be slid all the way open.

Combining such doors with a drive mechanism secured to the wall of the vehicle to open the door automatically is also known. Such drive mechanisms generally employ a wheel to drive a flexible linear-transmission element, a steel cable for example, guided by rollers and attached to the door panel to generate the sliding motion. The swinging motion is then induced by appropriate guide structures or generated by a second wheel connected to the arm. The two different motions are obtained with different motors in the known doors, which makes them complicated and expensive and takes up space.

SUMMARY OF THE INVENTION

The object of the present invention is to improve a swinging and sliding door with the aforesaid characteristics to the extent that both the swinging and the sliding motion can be obtained with one motor that operates at a constant speed and that both the door panel and the overall drive mechanism can be manufactured as one unit that takes up little space and is easy to install and remove.

This object is attained in accordance with the invention by the improvement wherein the axis of rotation of the first wheel and that of the second wheel are concentric with the axis of rotation of the pivoting arm and wherein both wheels can be coupled to a common motor by way of automatic clutches.

The drive mechanism with the two wheels in accordance with the invention is a simple way of obtaining both opening motions with one motor, which can be a reversible constant-speed electric motor.

The two automatic clutches can to advantage be electromagnetic clutches supplied with electric control signals, or other types, pneumatically controlled for example.

To ensure optimal torque for the two opening motions at all times it is of advantage to insert transmissions with different transmission ratios between the motor and the wheels. The transmissions can be toothed-belt transmissions.

The flexible linear-transmission element can in a known way be a steel ribbon or strip of steel, although a belt or toothed belt can also be employed.

The motion of the door and especially the two clutches can be controlled directly from the motion of the door panel by way of limit switches or sensors.

To allow the door panel to be opened manually when necessary, it is practical to design the clutches such that they can be released in the absence of a control signal, in the absence, that is, of current in the case of an electromagnetic clutch. To prevent the door panel from opening under its own weight when the vehicle is standing on a slope, it is practical to supply a control signal at least to the clutch that governs the sliding motion when the door is open and the motor is turned off. This procedure will keep the clutch engaged, and the motor will function as a brake to keep the door open. To ensure that the door can always be closed manually, the control signal can be discontinued by activating the door handle.

It is also an advantage for the flexible linear-transmission element to be fastened to the bolt of a door-bolting mechanism positioned on the door panel. The tension exerted on the transmission element when the opening motion is initiated will accordingly unbolt the door.

BRIEF DESCRIPTION OF THE DRAWINGS

One embodiment of a swinging and sliding door in accordance with the invention will now be described in detail with reference to the drawings, wherein.

DETAILED DESCRIPTION OF THE INVENTION

Figure 1:
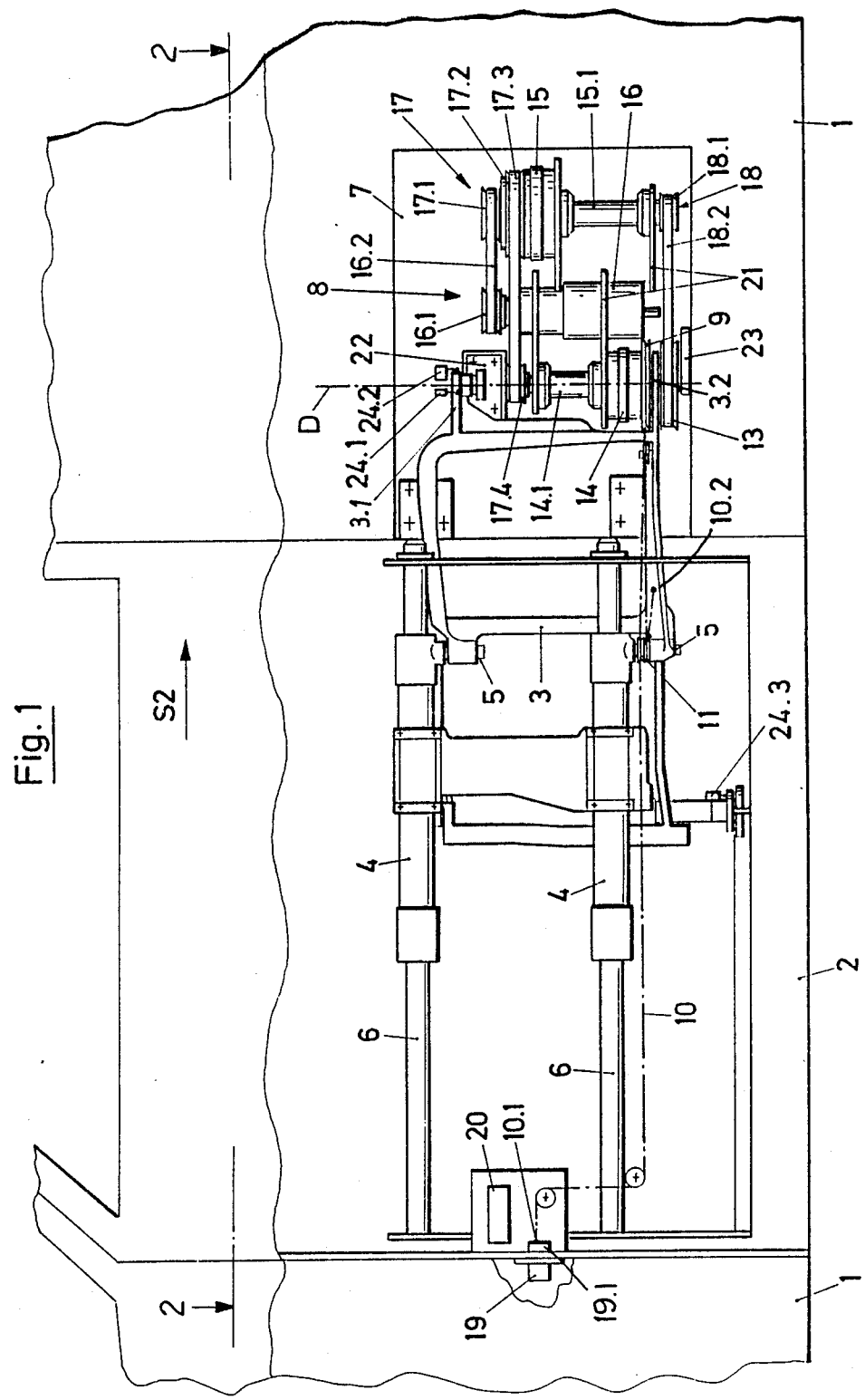
FIG. 1 is a highly schematic side view of a motor-vehicle swinging and sliding door with the outer wall partly removed.
Figure 2:
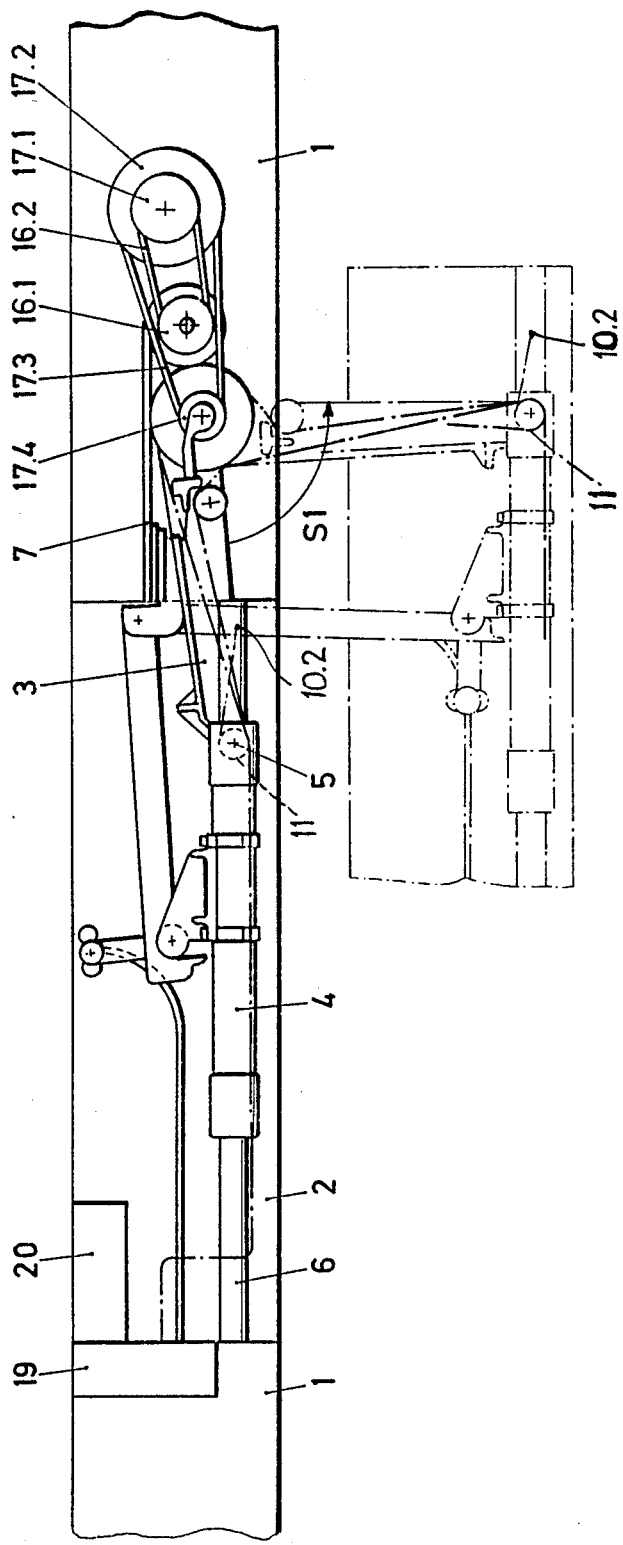
FIG. 2 is a section along the line II—II in FIG. 1.

As will be evident from FIGS. 1 and 2, the swinging and sliding door, which can be mounted on an automobile for example, has a panel 2 that closes off a doorway in the wall 1 of the vehicle and is connected to the wall by a pivoting arm 3. Pivoting arm 3 is shaped like a fork and its two inner ends 3.1 and 3.2 pivot around an axis D of rotation in bearings 22 and 23. Bearings 22 and 23 are mounted on a base plate 7 that is secured, by screws for example, to the wall 1 of the vehicle. At its two outer ends, pivoting arm 3 is secured by articulations 5 to carriages 4 in the form of sleeves that surround and slide back and forth on two rods 6 secured to the panel.

Figure 3:
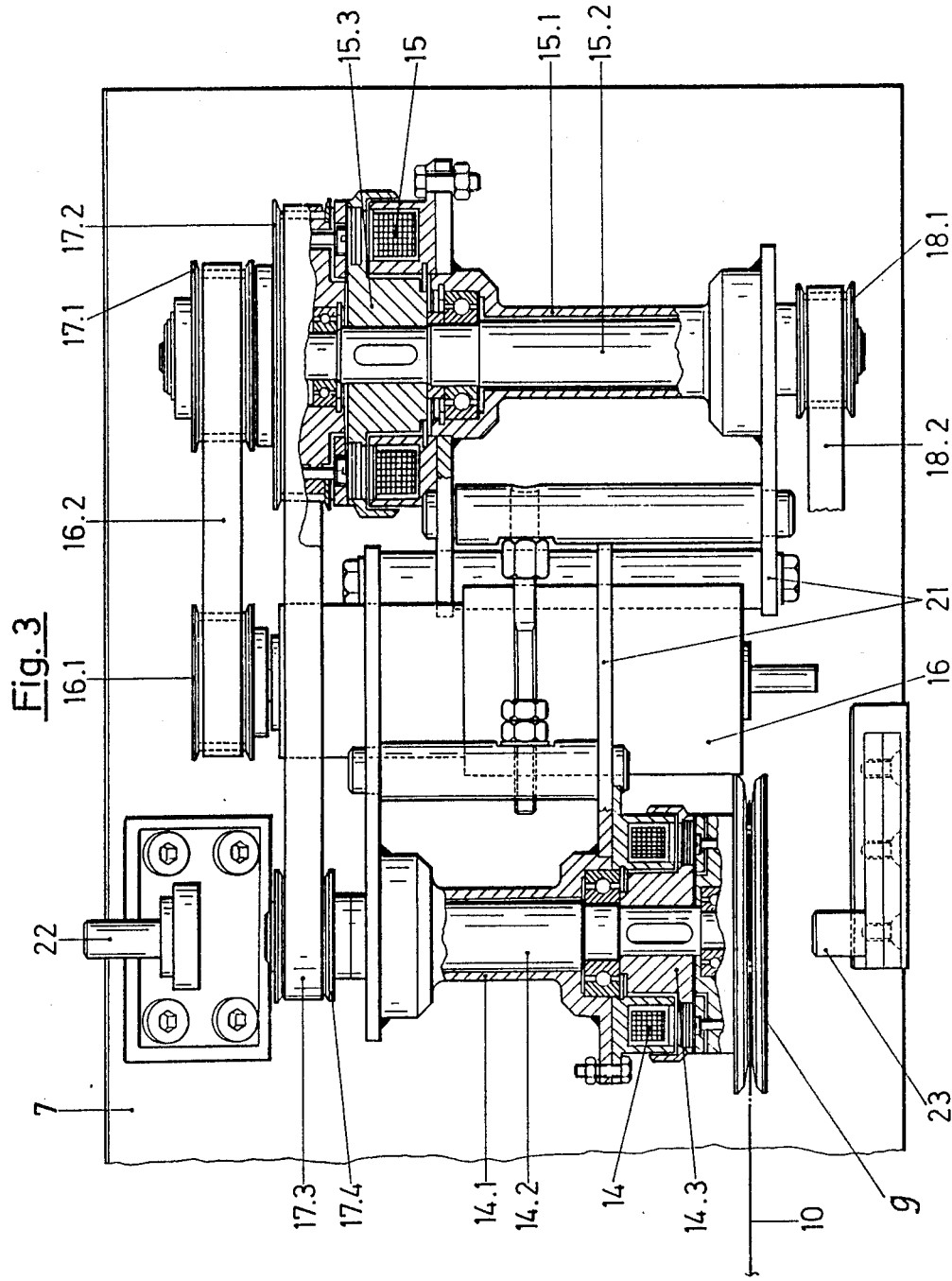
FIG. 3 is a larger-scale detail of the drive mechanism for the door illustrated in FIG. 1.

Positioned on base plate 7 is the mechanism 8 that drives panel 2. Drive mechanism 8 has a reversible electric motor 16 with a takeoff wheel 16.1 that is connected to a shaft 14.2 (FIG. 3) by means of a toothed belt 16.2 and of a toothed-belt transmission 17 consisting of wheels 17.1, 17.2, and 17.4 and of another toothed belt 17.3. The shaft is coaxial with the axis D of rotation of pivoting arm 3 and is accommodated in a housing 14.1. At the bottom of shaft 14.2 is a transmission wheel 14.3 that is connected to a wheel 9 by way of an electromagnetic clutch 14. Wheel 9 is a cable wheel and is also coaxial with axis D of rotation. Wheel 9 drives a steel cable 10 that wraps around it and has both ends surrounding a pair 11 of rollers that rotate in opposite directions on the outer end of pivoting arm 3. Cable 10 extends parallel to carriers 6, and one end 10.1 is secured to the forward end of panel 2 and the other end 10.2 to the rear end of the panel.

The purpose of wheel 9 is, as will be described in detail hereinafter, to generate the sliding motion.

Another wheel 13 is also mounted coaxial with axis D of rotation on the inner end 3.2 of pivoting arm 3. Second wheel 13 is driven by a transmission 18 consisting of a toothed belt 18.2 and an intermediate wheel 18 1. Intermediate wheel 18.1 rests on a shaft 15.2 accommodated in a housing 15.1. At the upper end of the shaft is a wheel 15.3 that can be coupled by way of an electromagnetic clutch 15 to the wheel 17.2 in the toothed-belt transmission 17 powered by motor 16.

Housings 14.1 and 15.1 and motor 16 are secured to base plate 7 by the mounts 21 partially represented in FIG. 1.

To open the door, motor 16 is switched on with clutches 14 and 15 still released. An electric control signal is forwarded to clutch 15, which engages, allowing motor 16 to drive second wheel 13 by way of toothed-belt transmission 18. Panel 2 opens out of the closed position in a motion S1 (FIG. 2). Once it has arrived at the limit indicated by the broken lines in FIG. 2, limit switches or sensors 24.2 release clutch 15, and an electric signal engages clutch 14, allowing motor 16 to initiate the rotation of first wheel 9 by way of toothed-belt transmission 17, and cable 10 opens panel 2 all the way in the direction indicated by arrow S2 (FIG. 1).

Before the opening motion can be initiated, the door-bolting mechanism that secures panel 2 to the wall 1 of the vehicle must be disengaged. This can be done in a practical way in that the front end 10.1 of steel cable 10 is attached to the bolt 19.1 in the mechanism 19. Tension is accordingly exerted on cable 10 when the swinging motion is introduced and is transmitted to bolt 19.1 to unbolt the panel.

Figure 4:
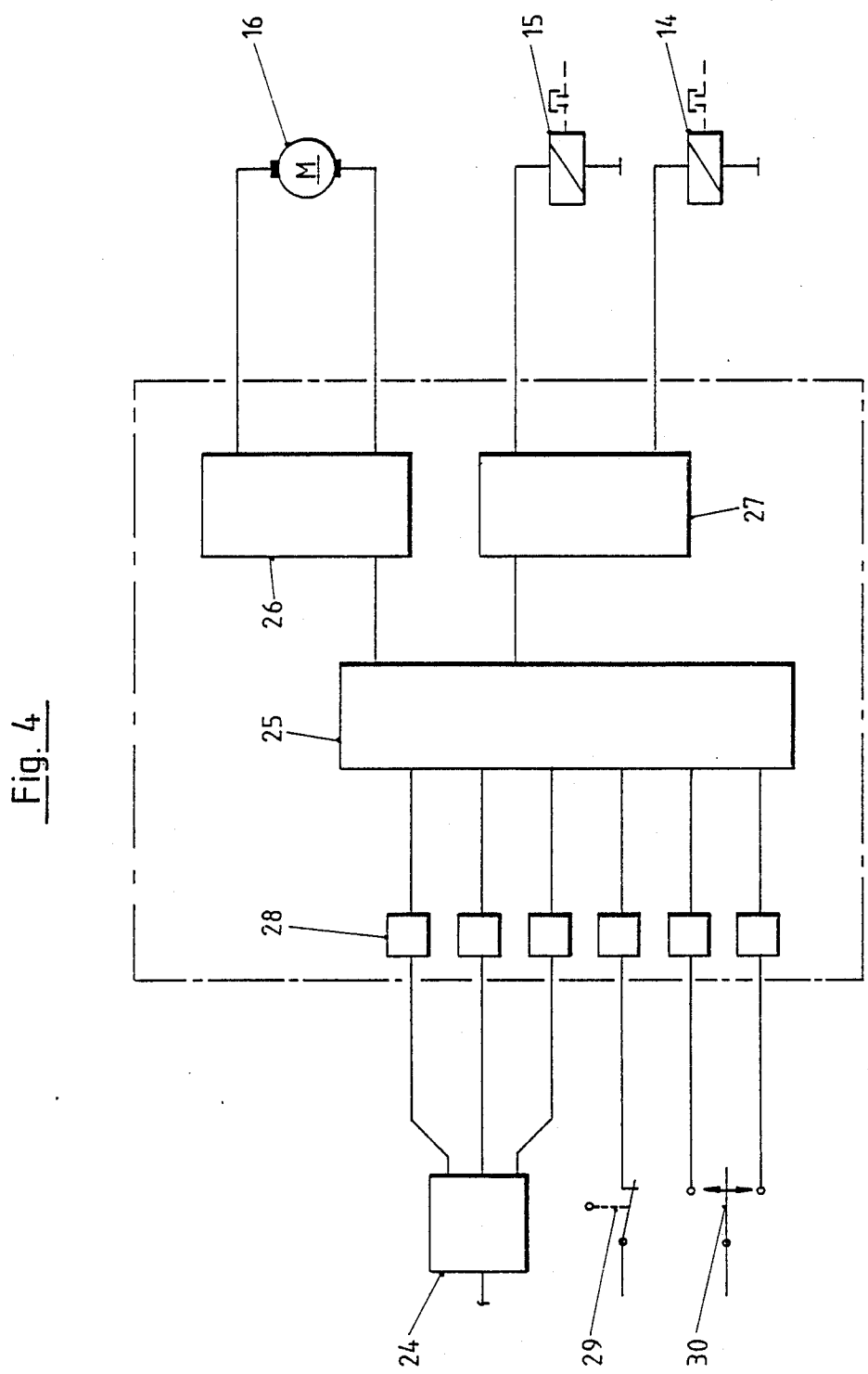
FIG. 4 is a block diagram of the electric control circuit for driving and controlling the door illustrated in FIGS. 1 through 3.

The drive mechanism is controlled by the electric circuit illustrated in FIG. 4. This circuit contains a logic stage 25 that communicates with motor 16 by way of an output stage 26. Clutches 14 and 15 are connected by way of another output stage 27. Logic stage 25 obtains some of its input signals from the limit switches or sensors 24.1, 24.2, and 24.3 that are generally labeled 24 in FIG. 4. Component 24.2 emits the signal for shifting from clutch 15 to clutch 14 component 24.1 the signal "the door is fully closed" and component 24.3 the signal "the door is fully opened". Logic stage 25 also receives a signal from a switching element 29 connected to door handle 20. This signal will be described in detail hereinafter. The signals for opening and closing the door are forwarded to logic stage 25 by way of a contact 30. The signals supplied to logic stage 25 are adjusted by adjustment stages 28. Since clutches 14 and 15 are operating-current clutches, they release in the absence of a control signal, and the door panel can always be opened by hand, especially in an emergency. The electric circuitry can also be designed such that clutch 14 will receive a control signal when panel 2 is open and motor 16 is turned off. When the vehicle is stopped on a slope, accordingly, the door will not close accidentally once the motor has been turned off, a situation that might injure people entering or leaving the vehicle. When clutch 14 is engaged, motor 16 will exert a braking effect that prevents the door panel from closing. To allow panel 2 to be closed at any time in this situation on the other hand, a switching element is connected to door handle 20 and interrupts the control signal for clutch 14 again when door handle 20 is activated.

As will be evident from the drawings, motor 16, housings 14.1 and 15.1, and the bearings 22 and 23 on base plate 7, which can be screwed in an unillustrated way to the wall 1 of the vehicle, are integrated into a single assembly that allows panel 2 to easily be installed and removed along with the overall drive mechanism.

Clutches 14 and 15 are controlled by limit switches and sensors 24.1, 24.2 and 24.3 by way of the electrical circuitry when panel 2 is activated such that only one clutch 14 or 15 is engaged while motor 16 is on.

It will be appreciated that the instant specifications and claims are set forth by way of illustration and not limitation, and that various modifications and changes may be made without departing from the spirit and scope of the present invention.

What is claimed is:

1. In a swinging and sliding door for a vehicle, the door having a door panel, at least one pivoting arm securable to a wall of the vehicle, for pivoting about an axis of rotation, a carriage articulated to one end of the arm and sliding back and forth on a carrier connected to the door panel, and a drive mechanism securable to said wall of the vehicle and having a first wheel driving a flexible linear-transmission element guided by rollers and attached to the door panel to generate the sliding motion and a second wheel that generates the swinging motion, the improvement comprising means mounting the first and second wheel for rotation about an axis of rotation which is concentric with the axis of rotation of the at least one pivoting arm and means including automatic clutches for coupling both wheels to a common motor.

2. The swinging and sliding door as in claim 1, wherein the clutches are electromagnetic clutches.

3. The swinging and sliding door as in claim 1, wherein the common motor is a constant-speed electric motor and wherein the coupling means comprises transmissions with different transmission ratios inserted between the motor and the wheels.

4. The swinging and sliding door as in claim 3, wherein the transmissions are toothed-belt transmissions.

5. The swinging and sliding door as in claim 3, wherein the motor, the transmissions, the clutches, and at least the first wheel are integrated into a single assembly mounted on a base plate that is attachable to said wall of the vehicle.

6. The swinging and sliding door as in claim 1, further comprising a pair of rollers on an outer end of the at least one pivoting arm for guiding the flexible transmission element.

7. The swinging and sliding door as in claim 1, wherein the door has a door-bolting mechanism and a bolt positioned on the door panel and wherein the flexible linear-transmission element is fastened to the bolt of the door-bolting mechanism.

8. The swinging and sliding door as in claim 1, further comprising means receptive of a control signal for controlling the clutches to maintain the clutches in a released state in the absence of the control signal.

9. The swinging and sliding door as in claim 8, further comprising means for producing the control signal when the door panel is open and the motor is turned off and for discontinuing the control signal for at least the clutch between the first wheel and the motor when a door handle is activated.

10. The swinging and sliding door as in claim 1, further comprising means for controlling the clutches to engage only one at a time when the motor is running and the door panel is opening and closing.

* * * * *